US007489302B2

(12) United States Patent
Moosavi et al.

(10) Patent No.: US 7,489,302 B2
(45) Date of Patent: Feb. 10, 2009

(54) HANDHELD MOBILE COMMUNICATION DEVICE WITH FLEXIBLE KEYS

(75) Inventors: Vahid Moosavi, Kitchener (CA); Steven H. Fyke, Waterloo (CA)

(73) Assignee: Research in Motion Limited, Waterloo, Ontario ( * ) Notice: Subject to any disclaimer, the term of this patent is extended or adjusted under 35 U.S.C. 154(b) by 337 days.

(21) Appl. No.: 11/469,636

(22) Filed: Sep. 1, 2006

(65) Prior Publication Data

US 2008/0055253 A1    Mar. 6, 2008

(51) Int. Cl.
*G09G 5/00* (2006.01)
(52) U.S. Cl. ........................................ 345/168; 345/169
(58) Field of Classification Search .......... 345/156–172
See application file for complete search history.

(56) References Cited

U.S. PATENT DOCUMENTS 5,339,097 A * 8/1994 Grant .......................... 345/168
5,360,280 A * 11/1994 Camacho et al. ............ 400/489
5,428,664 A   6/1995 Kobayashi

FOREIGN PATENT DOCUMENTS

| EP | 1381160 A1 | 1/2004 |
| GB | 2360740 A | 10/2001 |
| WO | 9704472 A | 2/1997 |
| WO | 9901999 A | 1/1999 |
| WO | 0237848 A | 5/2002 |
| WO | 2004059457 A1 | 7/2004 |

OTHER PUBLICATIONS

European Search Report 06120022.6, Apr. 11, 2007.

* cited by examiner

*Primary Examiner*—Vijay Shankar
(74) *Attorney, Agent, or Firm*—Novak Druce + Quigg LLP

(57) ABSTRACT

Keypad keys for handheld mobile communication devices feature flexible key bodies and actuators extending from the key bodies. Switches below the actuators are connected in series circuits. All actuators beneath an intended key must be depressed in order for the circuit to be closed and the key to be recognized as actuated. The flexible nature of the key bodies allows one actuator on a given key to be depressed while other actuators remain non-depressed. This prevents the key from being recognized as actuated when a only a portion of the key is depressed as occurs, for example, due to finger overlap.

40 Claims, 16 Drawing Sheets

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | | |
| Z | X | C | V | B | N | M | | | | |

*FIG. 13*

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | | |
| Y | X | C | V | B | N | M | | | | |

*FIG. 14*

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | | |
| W | X | C | V | B | N | M | | | | |

HANDHELD MOBILE COMMUNICATION DEVICE WITH FLEXIBLE KEYS

FIELD

In general, the present disclosure relates to wireless handheld mobile communication devices such as those used to send and receive email messages, phone calls or text messages, etc., all of which have come to include an alphanumeric keyboard of some sort (e.g., full-scale or reduced key format; QWERTY or other arrangement; etc.). More particularly, the present disclosure relates to a keyboard arrangement for such devices that is configured to minimize typing errors caused when an intended key and an adjacent key are engaged at substantially the same time by a user of the device because of finger overlap.

BACKGROUND

A generalized illustration of a wireless handheld mobile communication device is shown in FIG. 1. The device includes a housing, a graphical display screen, and a keyboard section with a plurality of keys thereon. The device further includes a thumbwheel and one or more navigational tools such as an auxiliary input device located between the display screen and the keyboard section. The auxiliary input device may be any of a trackball, cursor keys, a track wheel, a roller barrel, a touch pad, or a joystick.

Such wireless handheld mobile communication devices are becoming smaller and smaller for handheld use. In fact, they may be on the order of between fifty millimeters (approximately two inches) and eighty-nine millimeters (approximately three and one-half inches) in width, to facilitate palm-cradling of the device by a user. To facilitate such smaller device widths, the keys on wireless handheld mobile communication devices are being made smaller and smaller. In fact, on some such devices, the keys may be less than seven millimeters (approximately one quarter of an inch) in width, and as small as three millimeters (approximately one eighth of an inch) in width. As a result, a user's thumb (or other digit) may overlap several keys at the same time when the user is trying to depress an intended key on the keyboard, as illustrated in FIG. 1, which leads to typing errors.

BRIEF DESCRIPTION OF THE DRAWINGS

FIG. 13 illustrates an exemplary QWERTY keyboard layout;

FIG. 14 illustrates an exemplary QWERTZ keyboard layout;

FIG. 15 illustrates an exemplary AZERTY keyboard layout;

FIG. 16 illustrates an exemplary Dvorak keyboard layout;

FIG. 17 illustrates a QWERTY keyboard layout paired with a traditional ten-key keyboard;

FIG. 18 illustrates ten digits comprising the numerals 0-9 arranged as on a telephone keypad, including the * and # astride the zero;

FIG. 19 illustrates a numeric phone key arrangement according to the ITU Standard E.161 including both numerals and letters;

DETAILED DESCRIPTION

Figure 1:
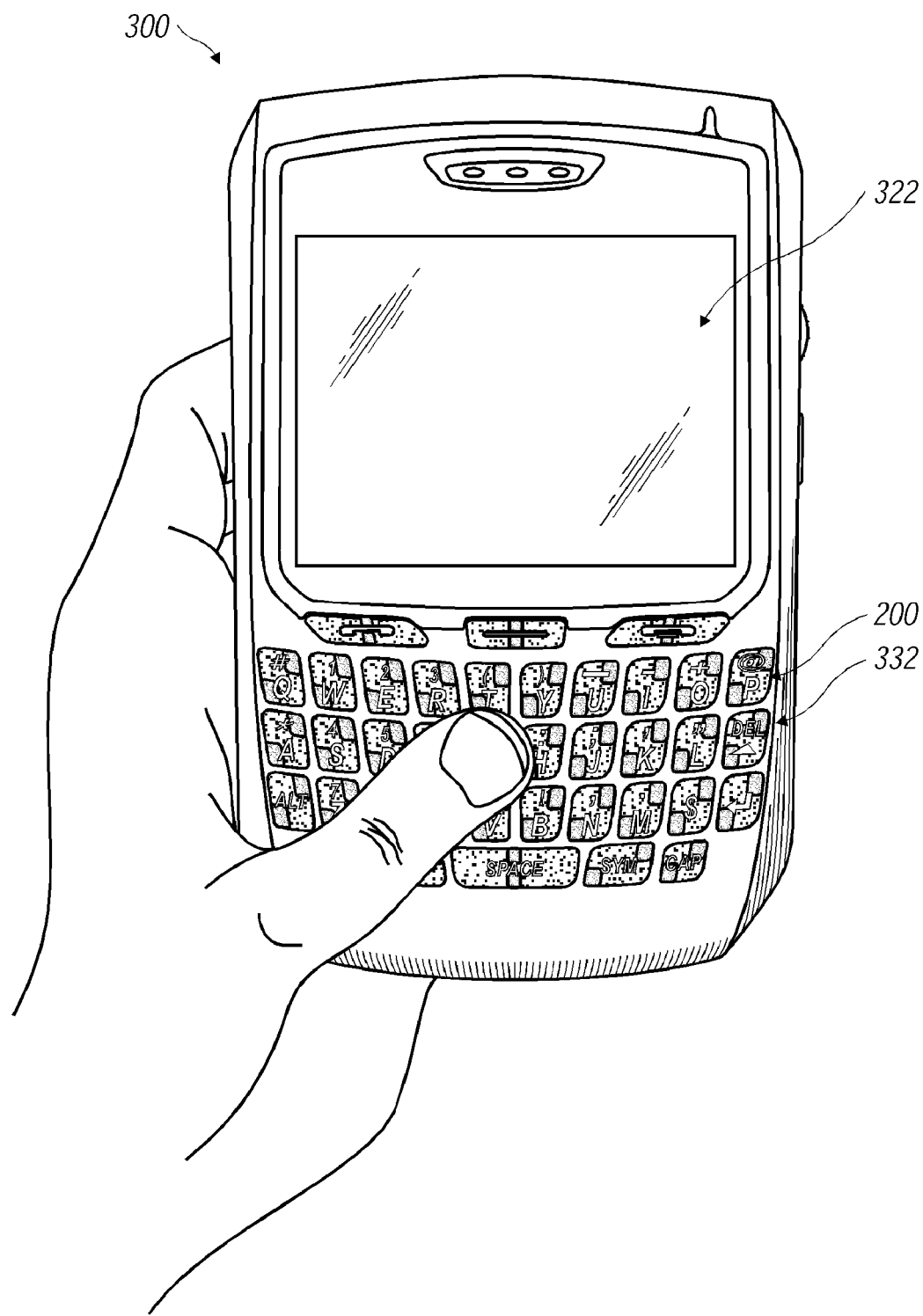
FIG. 1 is a generalized front view of a handheld mobile communication device.
Figure 2:
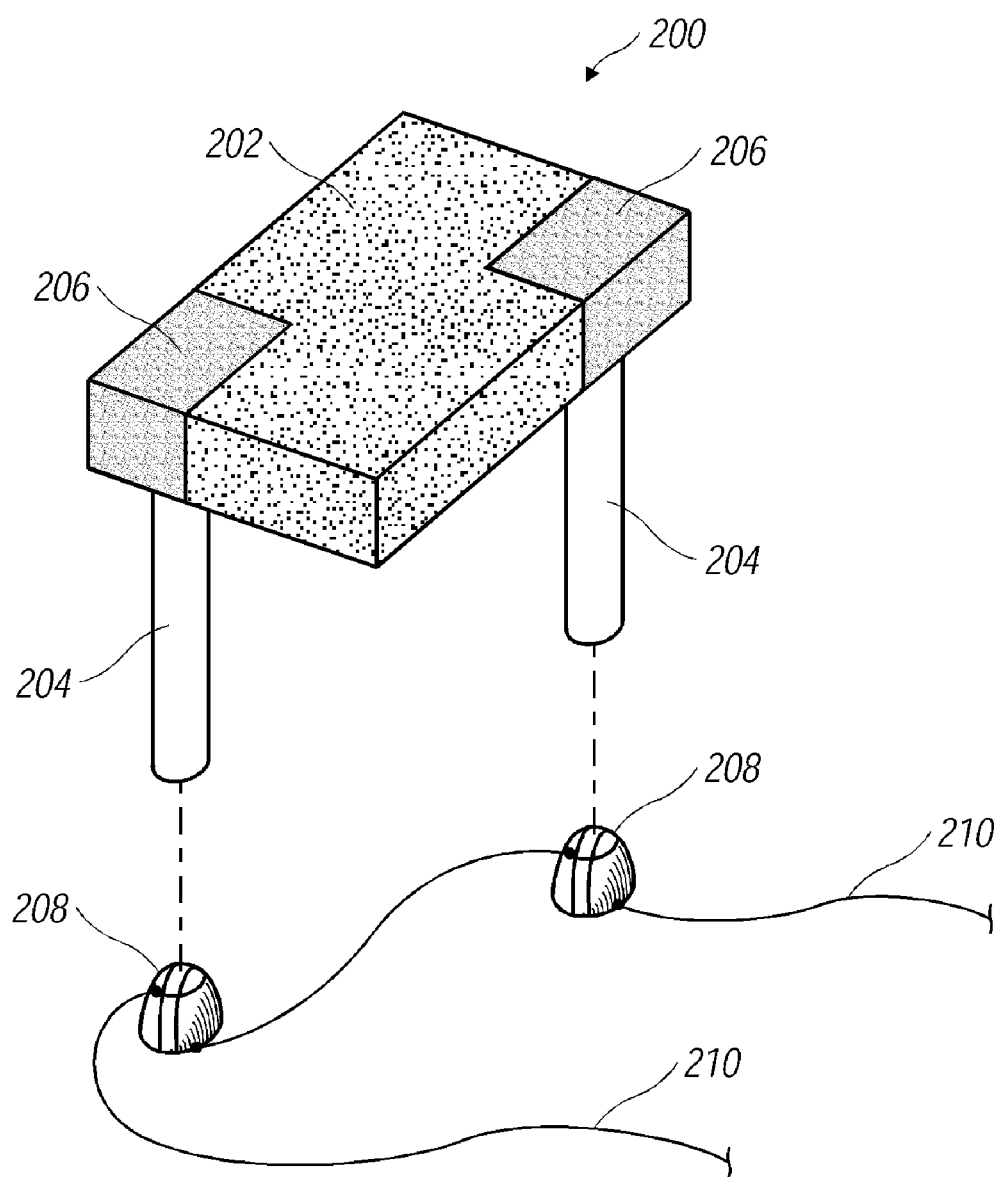
FIG. 2 is an exploded perspective view of a keypad key assembly.
Figure 3A:
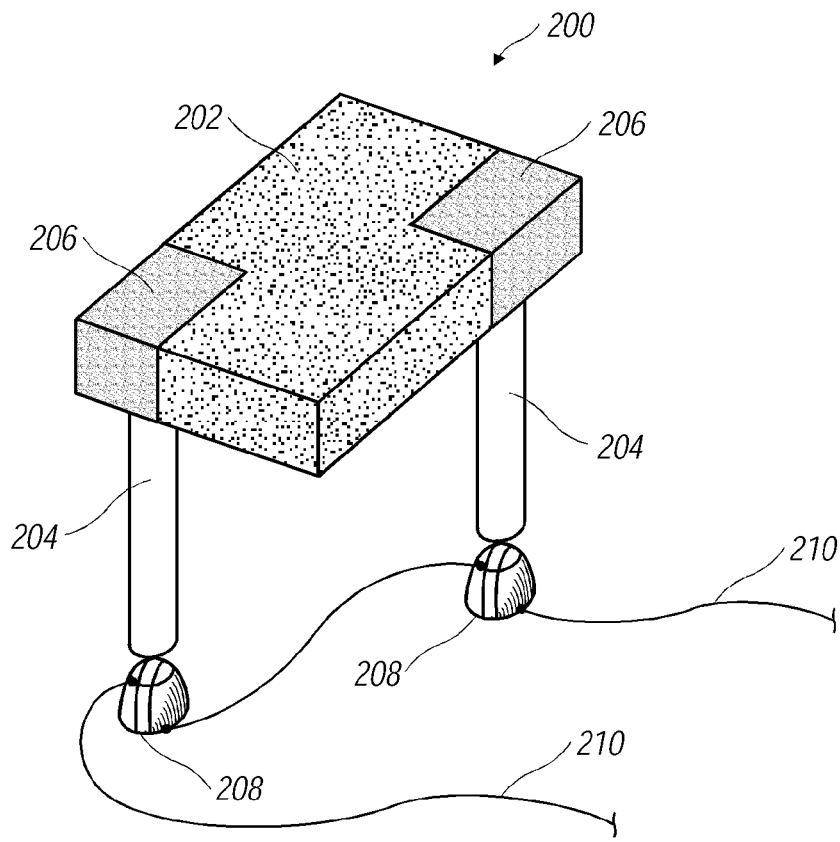
FIG. 3 is an assembled perspective view of a two-actuator keypad key assembly.
Figure 3B:
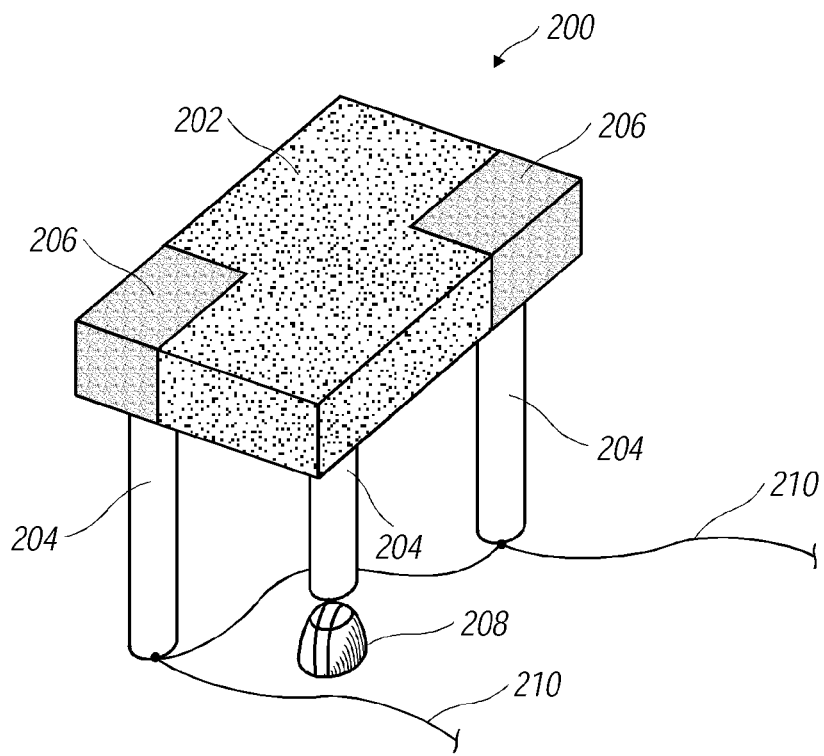

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent with importance placed on maintaining device hand-cradleability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" of the front face of the device where it is most advantageous to include a display screen that outputs information to the user and which is preferably above a keyboard utilized for data entry into the device by the user. If the screen is provided below the keyboard, a problem occurs in being able to see the screen while inputting data. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ, AZERTY or Dvorak layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device. As with the other software programs embodied within the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device.

Keys, typically of a push-button or push-pad nature, perform well as data entry devices but present problems to the user when they must also be used to affect navigational control over a screen-cursor. In order to solve this problem the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. A particularly usable embodiment provides the navigational tool in the form of a trackball which is easily utilized to instruct two-dimensional screen cursor movement in substantially any direction, as well as act as an actuator when the ball of the trackball is depressible like a button. The placement of the trackball is preferably above the keyboard and below the display screen; here, it avoids interference during keyboarding and does not block the user's view of the display screen during use.

In some configurations, the handheld electronic device may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices today. Moreover, the utility of the device is significantly enhanced when connectable within a system, and particularly when connectable on a wireless basis in a system in which both voice and text messaging are accommodated.

It should be appreciated at the outset that while the instant disclosure describes one or more preferred embodiments of a keyboard, variously configured as described above, such embodiments are presented solely for purposes of illustration and the scope of the appended claims is not intended to be limited to the specific embodiments described in the instant disclosure or illustrated in the attached figures.

The instant disclosure relates to handheld electronic devices and more particularly to mobile handheld communication devices comprising keyboards. As used herein, the term "handheld electronic device" describes a relatively small electronic device that is capable of being held in a user's hand. "Handheld electronic device" is a broad term that includes devices further classified as handheld communication devices, and mobile handheld communications devices, which can interact with one or more communications networks to transmit and receive data of various types, e.g., text, voice, data, etc.

Figure 6:
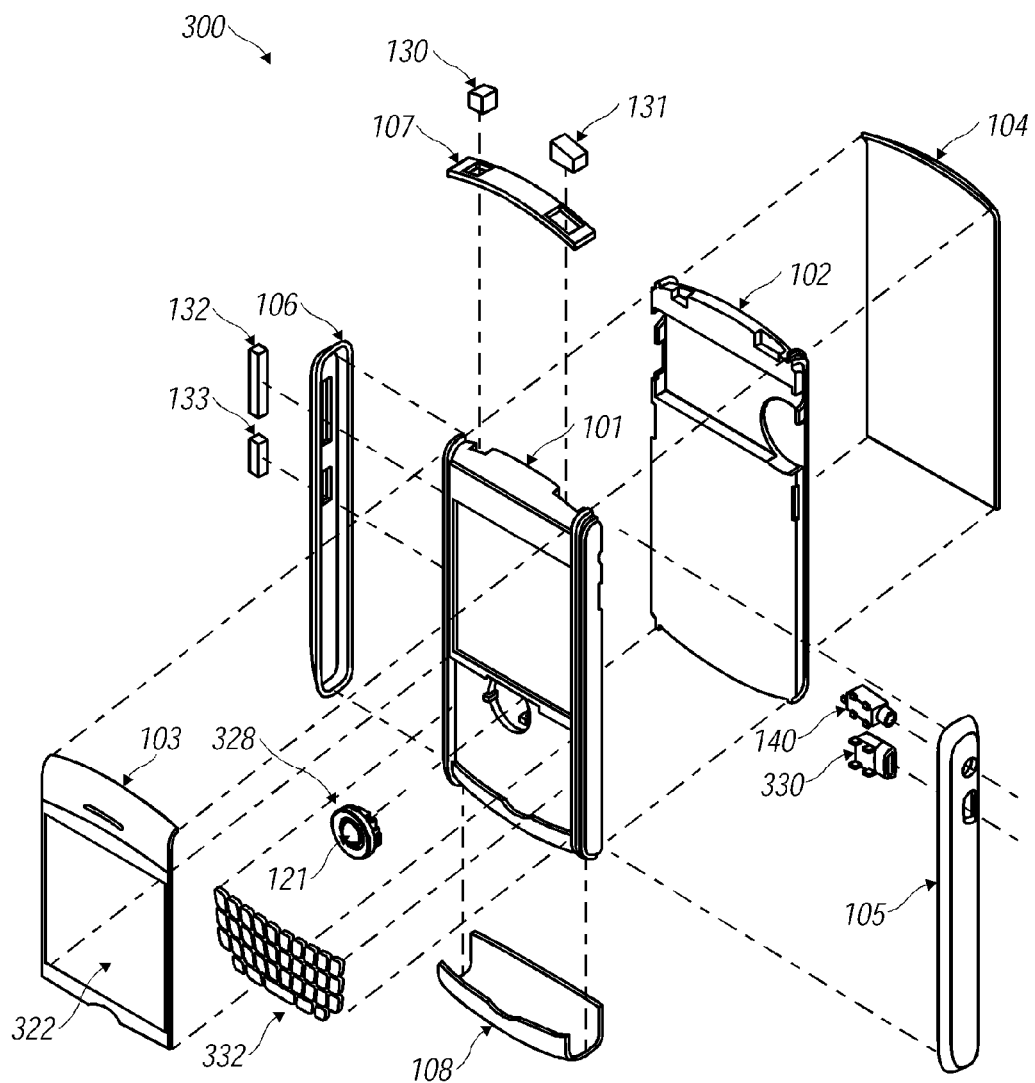
FIG. 6 is an assembly view of a handheld mobile communication device.
Figure 7:
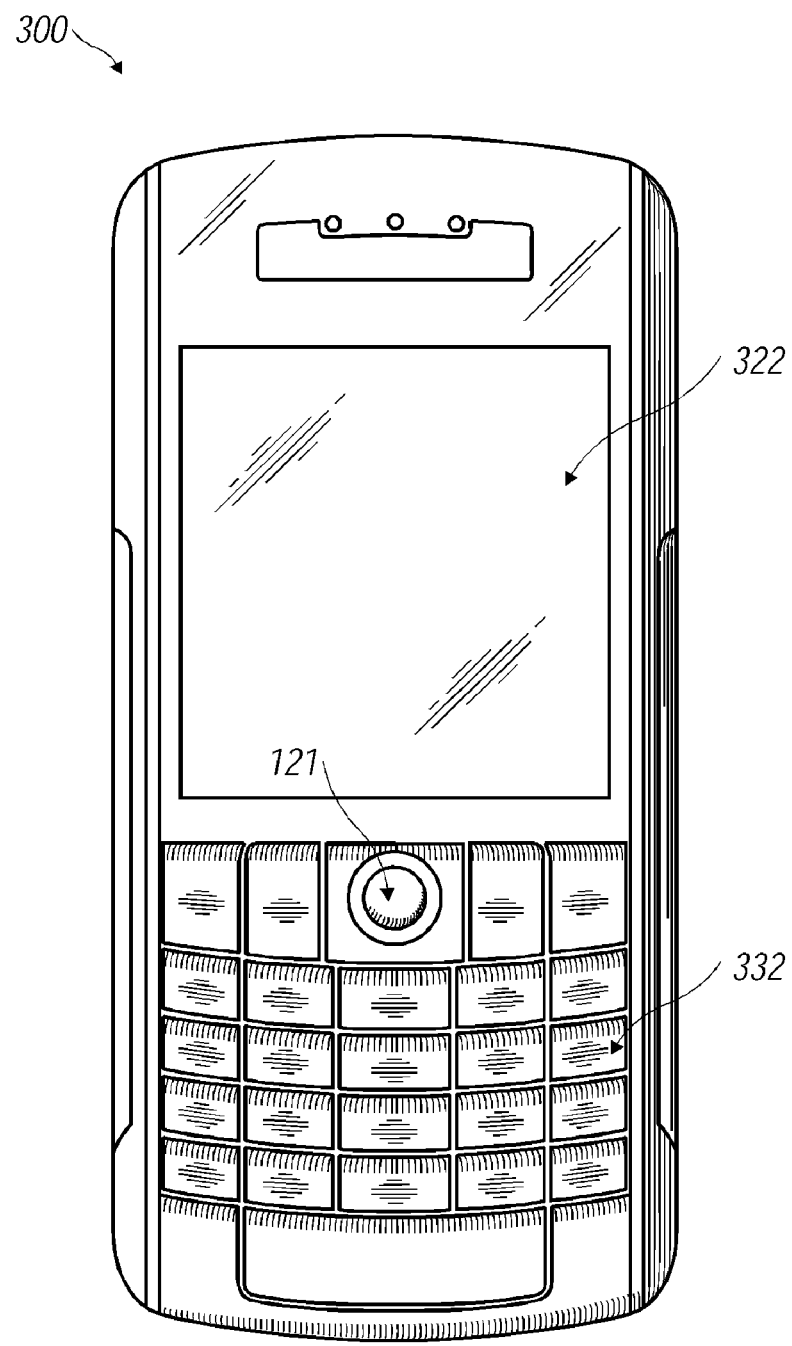
FIGS. 7-12 are front views of a handheld mobile communication device illustrating auxiliary input devices that are a trackball, cursor keys, a track wheel, a roller barrel, a touch pad, or a joystick, respectively.
Figure 8:
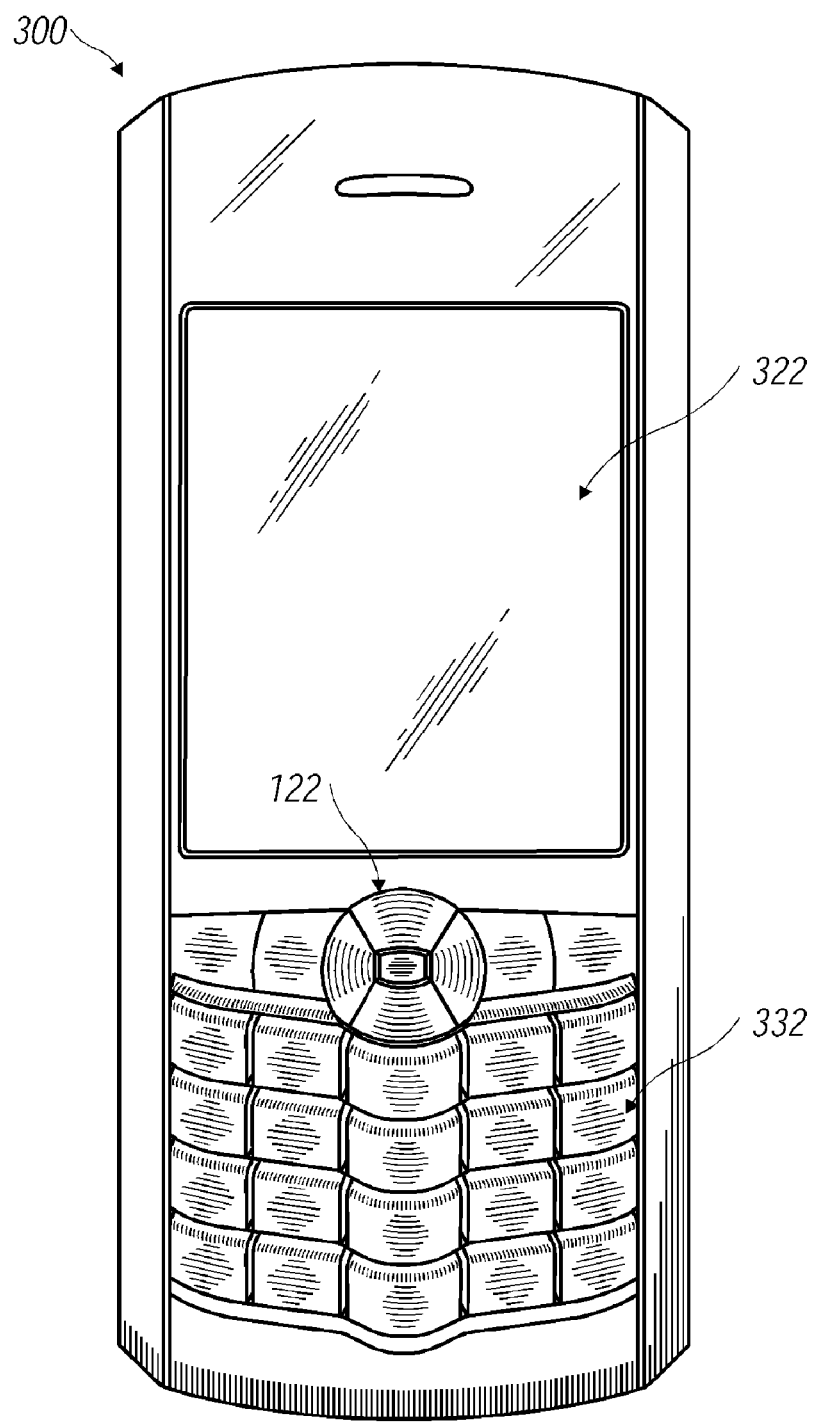
Figure 9:
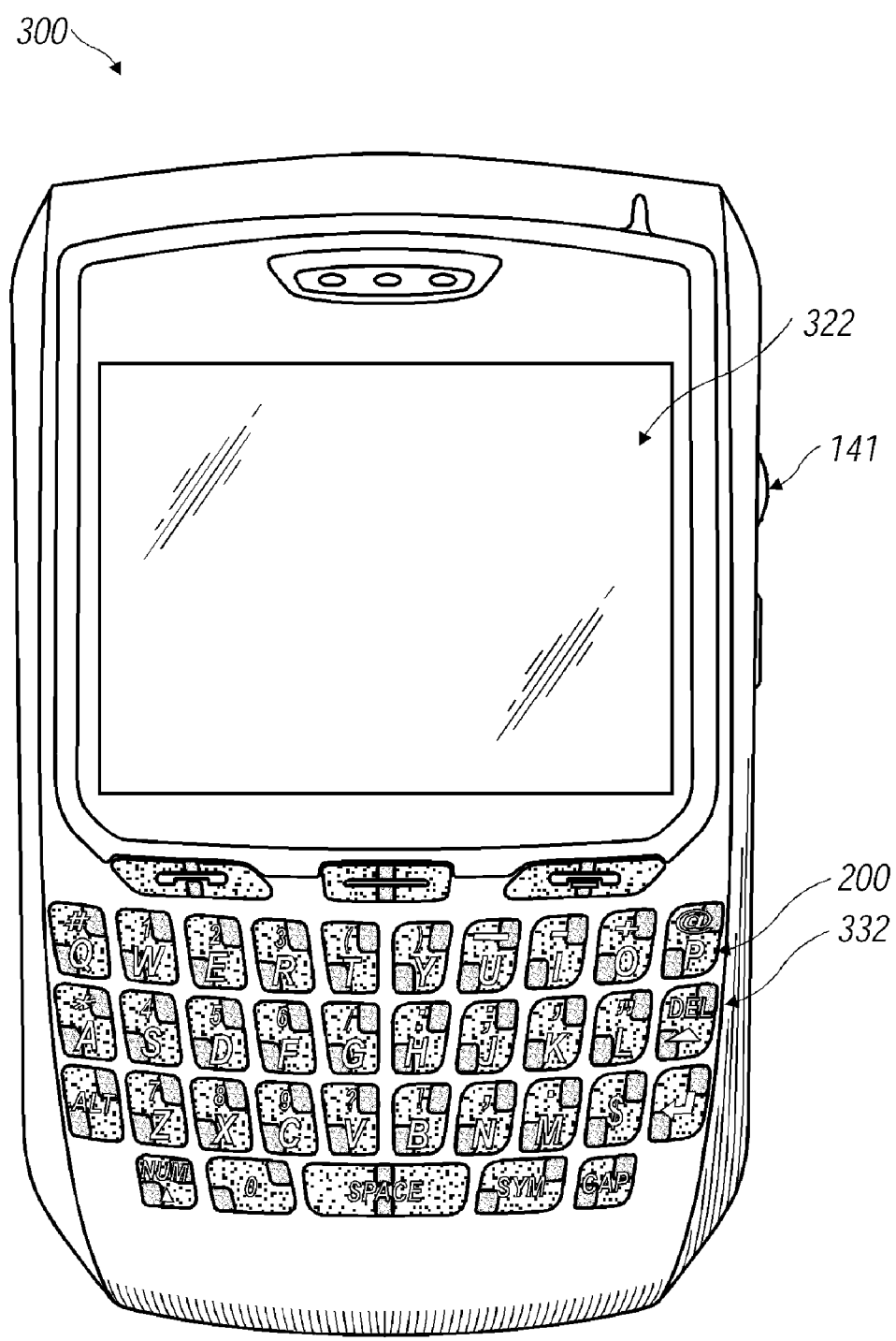
Figure 10:
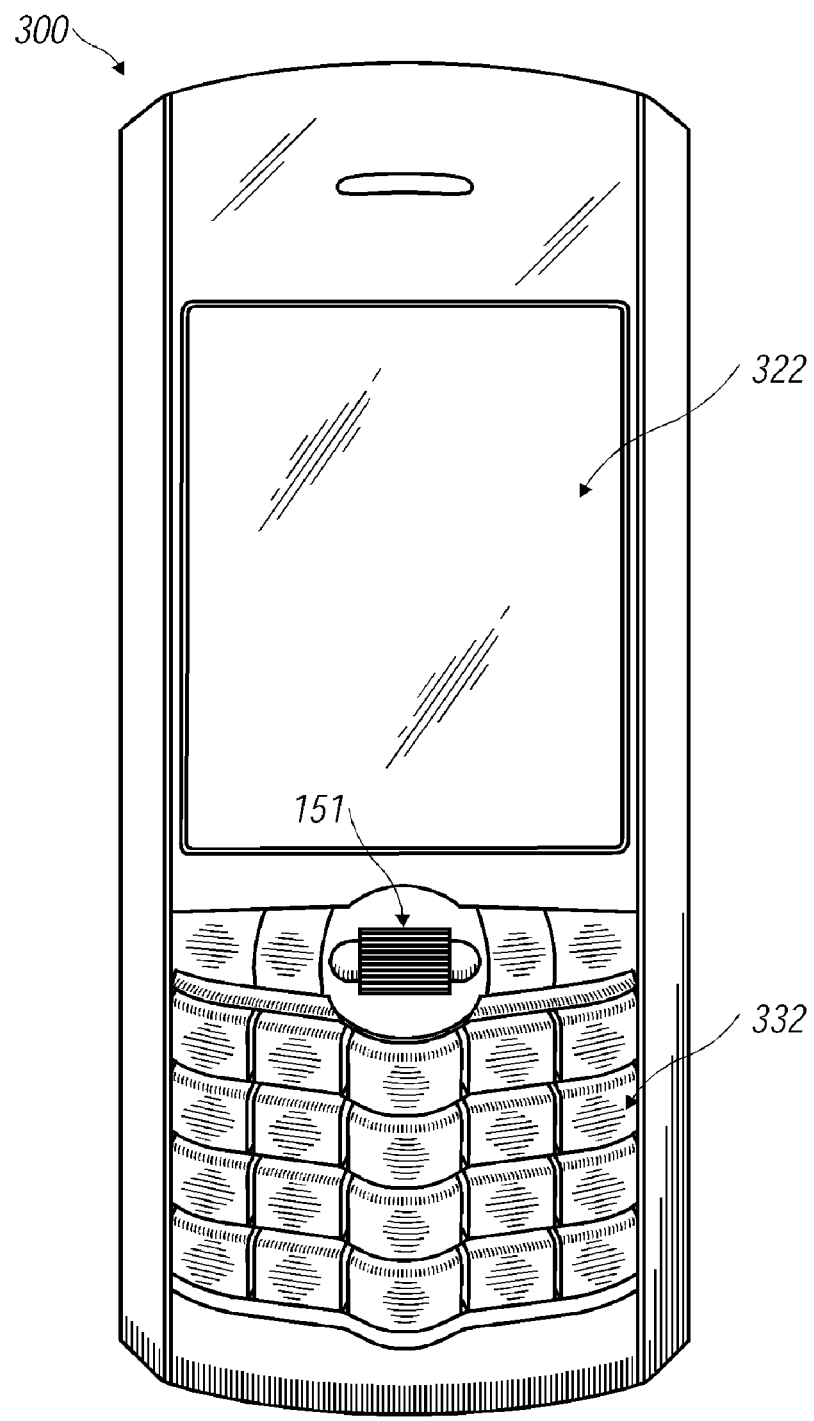
Figure 11:
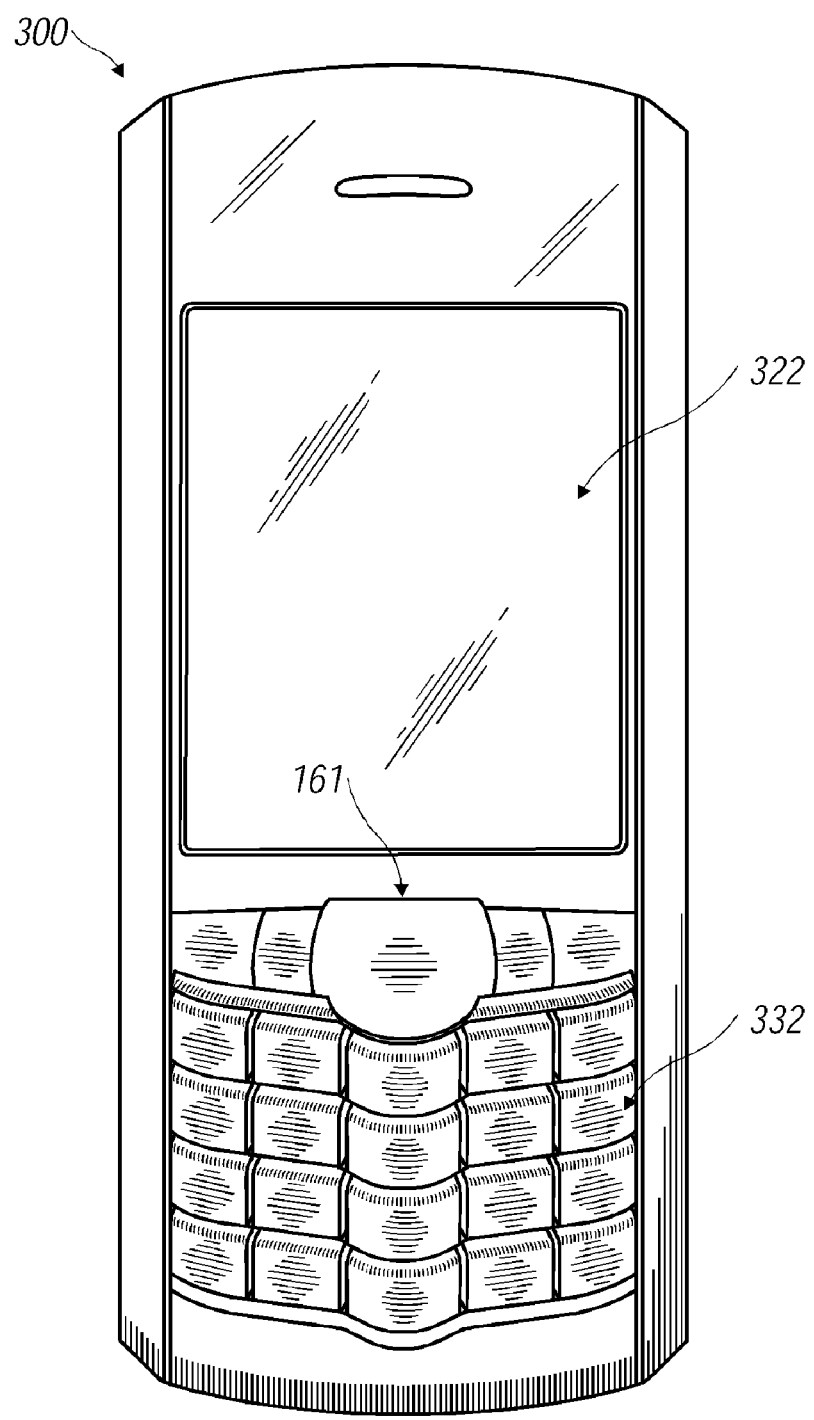
Figure 12:
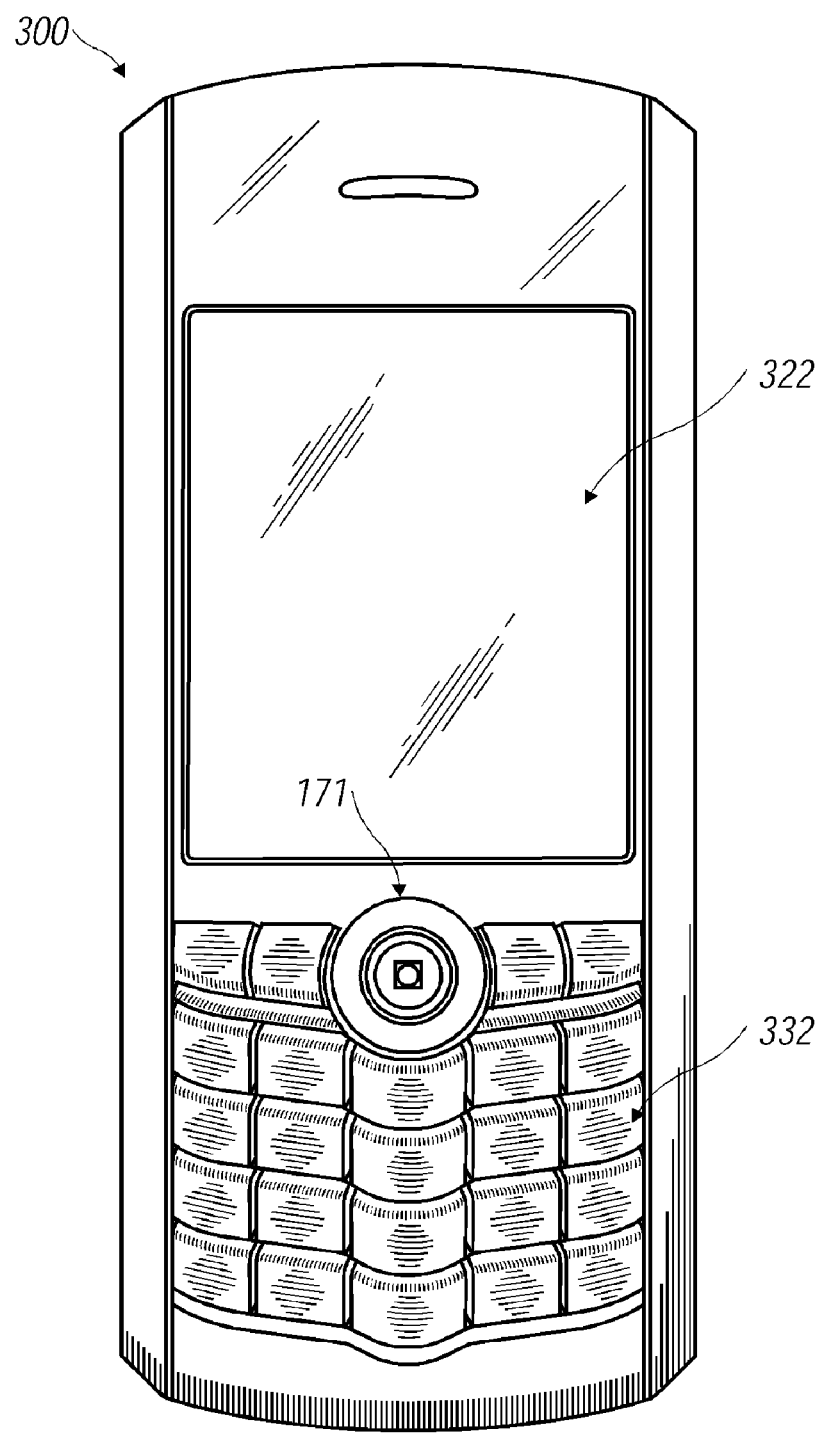

As may be appreciated from FIG. 6, the handheld electronic device 300 comprises a lighted display 322 located above a keyboard 332 suitable for accommodating textual input to the handheld electronic device 300 when in an operable configuration. Preferably, the display screen 322 and keyboard 332 are located at the front face of the handheld electronic device 300. As shown, the device 300 is of unibody construction, but it is also contemplated that the device may be of an alternative construction such as that commonly known as "clamshell" or "flip-phone" style. Regardless, in operable configuration for the device 300, the navigation tool (auxiliary input) 328 is located essentially between the display 322 and the keyboard 332.

The keyboard disclosed herein can be a full keyboard. A full keyboard refers to a keyboard on which all the keys of the alphabet are shown as indicia on the keys. Reference to a full keyboard in the remainder of the disclosure can be abbreviated as "keyboard." The format of the indicia shown on the keys can comprise, for example, the letters A-Z in one of a standard keyboard layout and/or numerals as described later in this writing. Examples of different types of standard keyboard layouts include, but are not limited to: QWERTY, QWERTZ, AZERTY, and Dvorak layouts. In the embodiments disclosed, the keyboard is secured to the housing and the keys are located on the face side of the device.

In the alternative to comprising a full keyboard, the keyboard can be configured to comprise a plurality of keys wherein alphabetic letters are associated with the keys, but at least a portion of the individual keys have multiple alphabetic letters associated therewith. This type of configuration is referred to as a reduced keyboard (in comparison to the full keyboard described immediately above) and can, among others comprise QWERTY, QWERTZ, AZERTY, and Dvorak layouts.

A wireless handheld mobile electronic device according to the present disclosure may have an overall or general configuration like that shown in FIG. 1, or it may have another configuration as may be desired. The keys and keyboard of a device according to the present disclosure, however, are as described below.

Figure 4A:
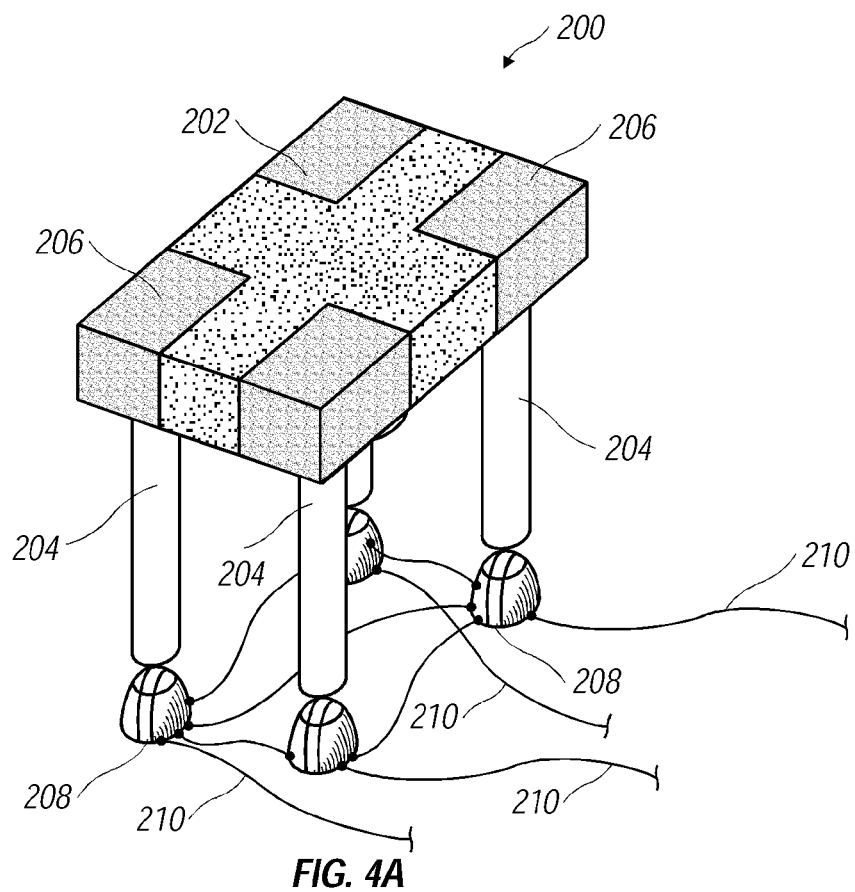
FIG. 4 is an assembled perspective view of a four-actuator keypad key assembly.
Figure 4B:
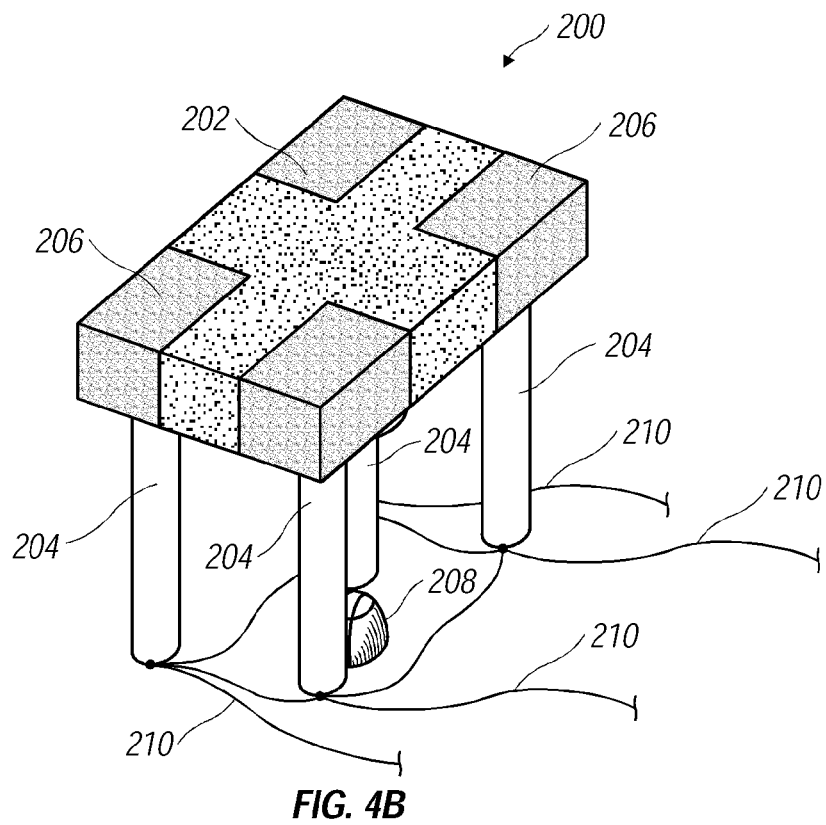

In particular, a keypad arrangement and keypad key 200 are illustrated in FIGS. 2 through 5. Each key 200 in the keypad arrangement may have a generally rectangular key body 202 and a pair of peg actuators 204 extending downward from the undersurface of the key body 202, i.e., toward the support frame face 205 on which the keys 200 are mounted. As illustrated in FIG. 4, four peg actuators 204 can also extend downward from the undersurface of the key body 202, i.e., toward the support frame face 205. Four peg actuators 204 would be used in instances where the keys 200 are especially small and thus more likely to induce finger overlap. In such situations, using four peg actuators 204, as opposed to two peg actuators 204, would be optimal as four peg actuators 204 would require the user to make squarer contact with the intended key 200 and thus reduce the likelihood of inadvertent key 200 depression from finger overlap. The major portion of the key body 202 is made from a flexible plastic material but the portions 206 of the key body 202 by means of which the actuators 204 are interconnected to the key body 202 are harder/stiffer than the flexible portion of the key body 202. In the illustrated embodiment 200, the actuators 204 are located at diagonally opposite corners of the rectangular key body 202, which is 180° (i.e., 360° divided by the number of actuators 204) circumferentially apart from each other about a centerpoint of the key body 202.

For each keyboard key 200, there is a set of closeable switches 208, e.g., dome switches, resistive switches, or capacitive switches, mounted on the support frame face 205 and connected together in a series circuit 210 that connects to the device's processor 338. The number of closeable switches 208 associated with each key 200 is the same as the number of actuators 204 and the closeable switches 208 are connected to the actuators 204. Furthermore, the closeable switches 208 associated with each actuator 204 also bias the keyboard key 200 away from the support frame face 205 toward an unactuated position. (It will be understood that the device housing retains the keypad keys in their respective positions.)

In another embodiment, centered under each keyboard key 200 is a closeable switch 208 mounted on the support frame face 205. Connected to this centered closeable switch 208 is a centrally located actuator 204 that extends downward from the central undersurface of the key body 202. Two or four opposing actuators 204, located at diagonally opposite corners of the rectangular key body 202, are provided peripherally about the central actuator 204 beneath the keyboard key 200. The peripheral actuators 204 effectively surround the centered closeable switch 208 and are connected together in a series circuit 201 that connects to the device's processor 338—the central actuator 204 may or may not be connected to this series circuit 201. However, the actuators 204 along the periphery do not provide tactile feedback to the user—only the centered closeable switch 208 and actuator 204 provide tactile feedback to the user. The four peripheral actuators 204—are connected to the less flexible portions 206 of the key body 202 while the central actuator 204 is connected to the more flexible plastic material comprising the major portion of the key body 202.

Figure 5:
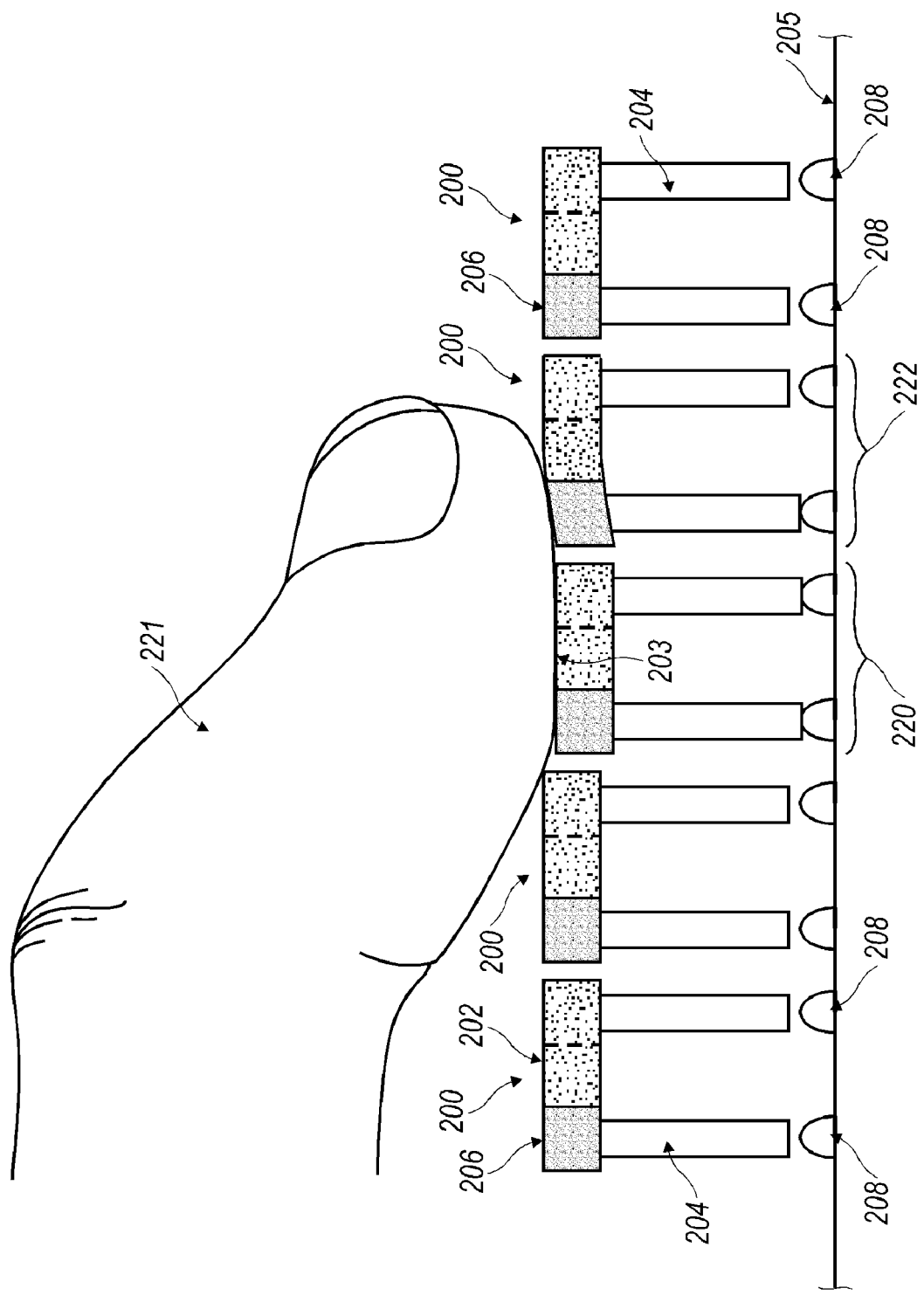
FIG. 5 is a side view of a keypad and keyboard arrangement.

The configuration of the keypad keys 200 and the associated series circuit 210 arrangement of the closeable switches 208 helps prevent or minimize typing errors due to finger overlap of multiple keys by necessitating that all actuator interconnect portions 206 on the keypad key body 202 be depressed in order for a key 200 to be recognized as actuated. For example, as illustrated in FIG. 5, the central key 220 is the key the user intends to depress with his or her thumb 221. The thumb 221 covers the entire face 203 of the key body 202 of the intended key 220, and therefore both actuators 204 of that key 220 are depressed, thereby closing both associated switches 208 and completing the associated series circuit 210 such that the intended key 220 is recognized as actuated by the device's processor 338. As further illustrated, however, the user's thumb 221 extends beyond the intended key 220 and partially overlaps an adjacent key, e.g., unintended key 222. However, because the mid portion of the key body 202 is flexible, the actuator 204 under the tip of the user's thumb 221 may be depressed and its associated switch 208 closed, but the other actuator 204 associated with the key 222 remains in its non-depressed or unactuated position. As a result, the switch 208 associated with that actuator 204 will remain open, hence leaving the series circuit 210 associated with the unintended key 222 open, and the processor 338 will not recognize the unintended key 222 as having been depressed.

As illustrated more clearly in FIGS. 7 through 12, respectively, the navigation controller assembly 328 can comprise several forms that include, but are not limited to: a trackball 121, cursor keys 122, a track wheel 141, a roller barrel 151, a touch pad 161, or a joystick 171. The location of the trackball 121, cursor keys 122, roller barrel 151, touch pad 161, or joystick 171 between the display 322 of the handheld communication device 300 and the keyboard 332 provides the user with a familiar location for the navigation controller assembly 328. Similarly, the location of the track wheel 141 on the side of the device 300 also provides the user with a familiar location for the navigation controller assembly 328.

The various characters, commands and functions associated with keyboard typing, in general, are traditionally arranged using various conventions. The most common of these in the United States, for instance, is the QWERTY keyboard layout. Others include the QWERTZ, AZERTY, and Dvorak keyboard configurations of the English language alphabet.

The QWERTY keyboard layout is the standard English-language alphabetic key arrangement 44 and is exemplified in FIG. 13. In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in the drawing for Sholes' patent application in 1878.

The QWERTZ keyboard layout is normally used in German-speaking regions. This alphabetic key arrangement 44 is shown in FIG. 14. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

The AZERTY keyboard layout is normally used in French-speaking regions. This alphabetic key arrangement 44 is shown in FIG. 15. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 16, 17, 18, 19:
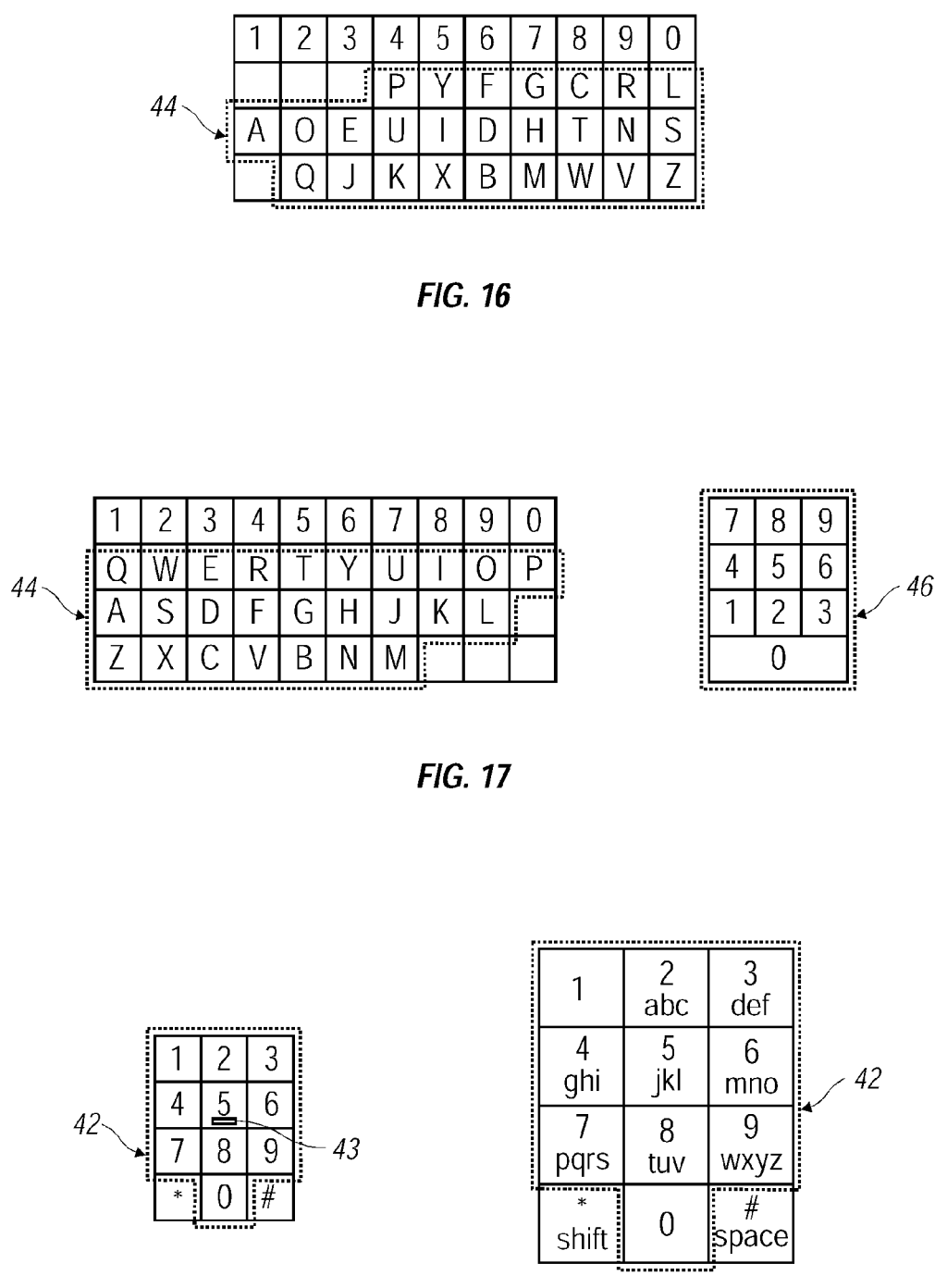

The Dvorak keyboard layout was designed in the 1930s by August Dvorak and William Dealey. This alphabetic key arrangement 44 is shown in FIG. 16. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. Exemplary numeric key arrangements are shown in FIGS. 13-16 wherein the numbers 1-9 and 0 are positioned above the alphabetic keys. In another numeric key arrangement, numbers share keys with the alphabetic characters, such as for example, the top row of the QWERTY keyboard (not shown). Yet another exemplary numeric key arrangement is shown in FIG. 17, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a "ten-key" computer keyboard keypad. Additionally, a numeric phone key arrangement 42 is shown in FIGS. 18 and 19.

As shown in FIG. 18, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

It is desirable for handheld electronic devices 300 to include a combined text-entry keyboard and a telephony keyboard. Examples of such mobile communication devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone key pads.

In embodiments of the handheld electronic device 300 having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

Other embodiments can comprise a full keyboard for alphabetic characters and incorporate a combined numeric keyboard. In this embodiment, numeric characters share keys with alphabetic characters on the top row of the QWERTY keyboard (not shown).

In order to further reduce the size of the handheld electronic device 300 without making the physical keys or software keys too small, the handheld electronic device 300 can be configured to comprise a reduced keyboard, where more than one character/command/function is associated with each of at least a portion of the plurality of keys. Consequently, certain keys can be ambiguous since more than one character is represented by, or associated with, a particular key even though only one of those characters is typically intended by the user when activating the key. The reduced key arrangement is exemplified within FIGS. 20 and 21.

Figure 20:
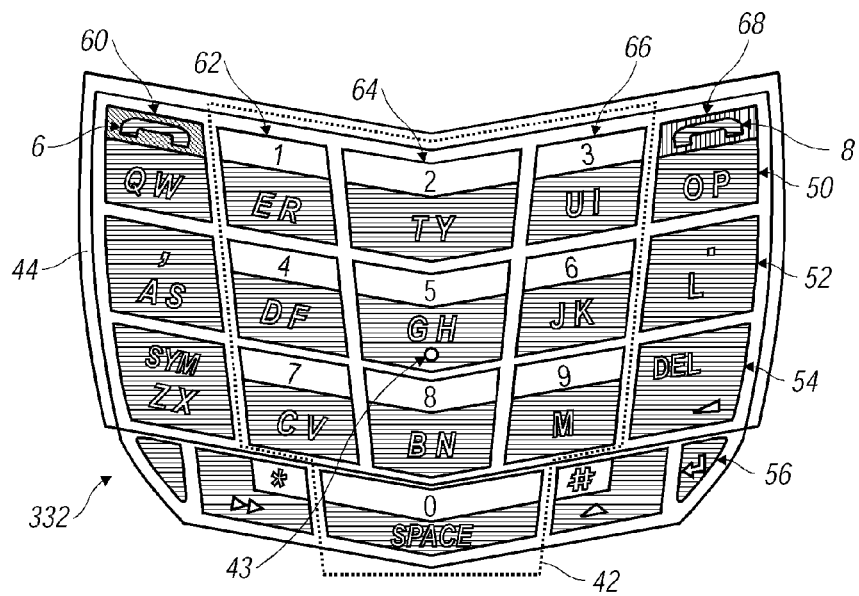
FIG. 20 is a detail view of a reduced QWERTY keyboard.

A reduced key arrangement 332 is presented in FIG. 20. Fourteen keys on the keyboard 332 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement.

In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 332 includes a "send" key 6 and an "end" key 8. The "send" key 6 is positioned in the upper left corner of the keyboard 332 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 21:
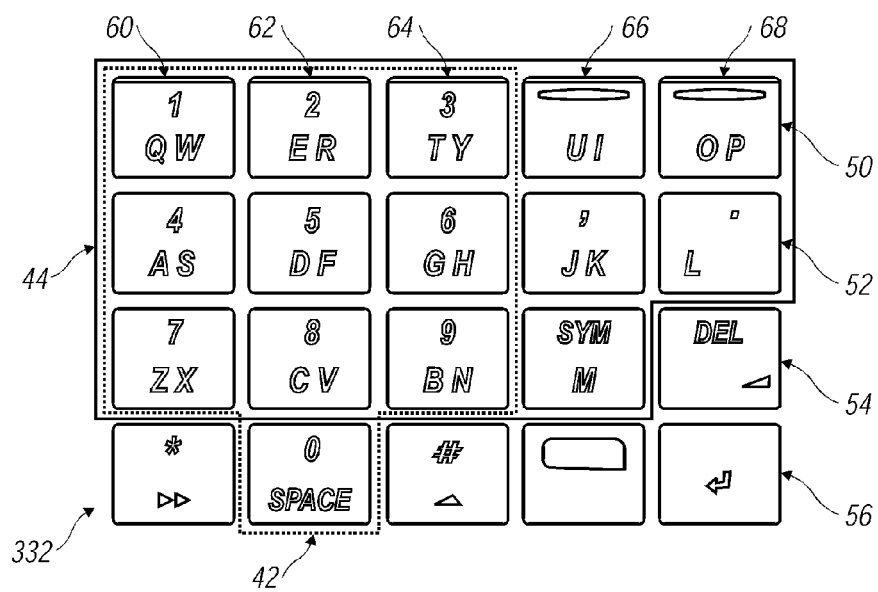
FIG. 21 is a detail view of an alternative reduced QWERTY keyboard.

FIG. 21 shows a similar format for the reduced QWERTY arrangement of alphabetic characters 44, but the numeric phone key arrangement 42 is positioned in the first 60, second 62, and third 64 columns instead of being centered on the keyboard 332. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/.". The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight Thus, the processor 338 of the handheld electronic device 300 can be programmed with software to determine or predict what letter or word has been intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage. The software preferably also has the ability to recognize character letter sequences that are common to the particular language, such as, in the case of English, words ending in "ing." Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone keypad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text on nine key" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text.

Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Further aspects of the environments, devices and methods of employment described hereinabove are expanded upon in the following details. An exemplary embodiment of the handheld electronic device 300 is shown in FIGS. 1, 7-12 and is cradleable in the palm of a user's hand. The size of the device 300 is such that a user is capable of operating the device 300 using the same hand that is holding the device 300. In an embodiment, the user is capable of actuating all features of the device 300 using a single thumb of the cradling hand. In another embodiment, the handheld device 300 features a keyboard 332 on the face of the device 300, and the keyboard 332 is actuable by the thumb of the hand cradling the device 300. The user may also hold the device 300 in such a manner to enable two thumbs to type on the device 300. Furthermore, the user may use fingers rather than thumbs to actuate the keys on the device 300. In order to accommodate palm-cradling of the device 300 by the average person, the length, or height, of the device 300 is generally greater than the width, and the width is preferably between approximately fifty and seventy-six millimeters (approximately two and three inches), but by no means limited to such dimensions.

The handheld electronic device 300 includes an input portion and an output display portion. The output display portion can be a display screen 322, such as an LCD or other similar display device.

The input portion includes a plurality of keys that can be of a physical nature such as actuable buttons. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

All or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Thus, the desired character, command or function is obtained by depressing the physical key corresponding to the character, command or function displayed at a corresponding position on the display screen, rather than touching the display screen 322. To aid the user, indicia for the characters, commands and/or functions most frequently used are preferably positioned on the physical keys and/or on the area around or between the physical keys. In this manner, the user can more readily associate the correct physical key with the character, command or function displayed on the display screen 322.

Figure 22:
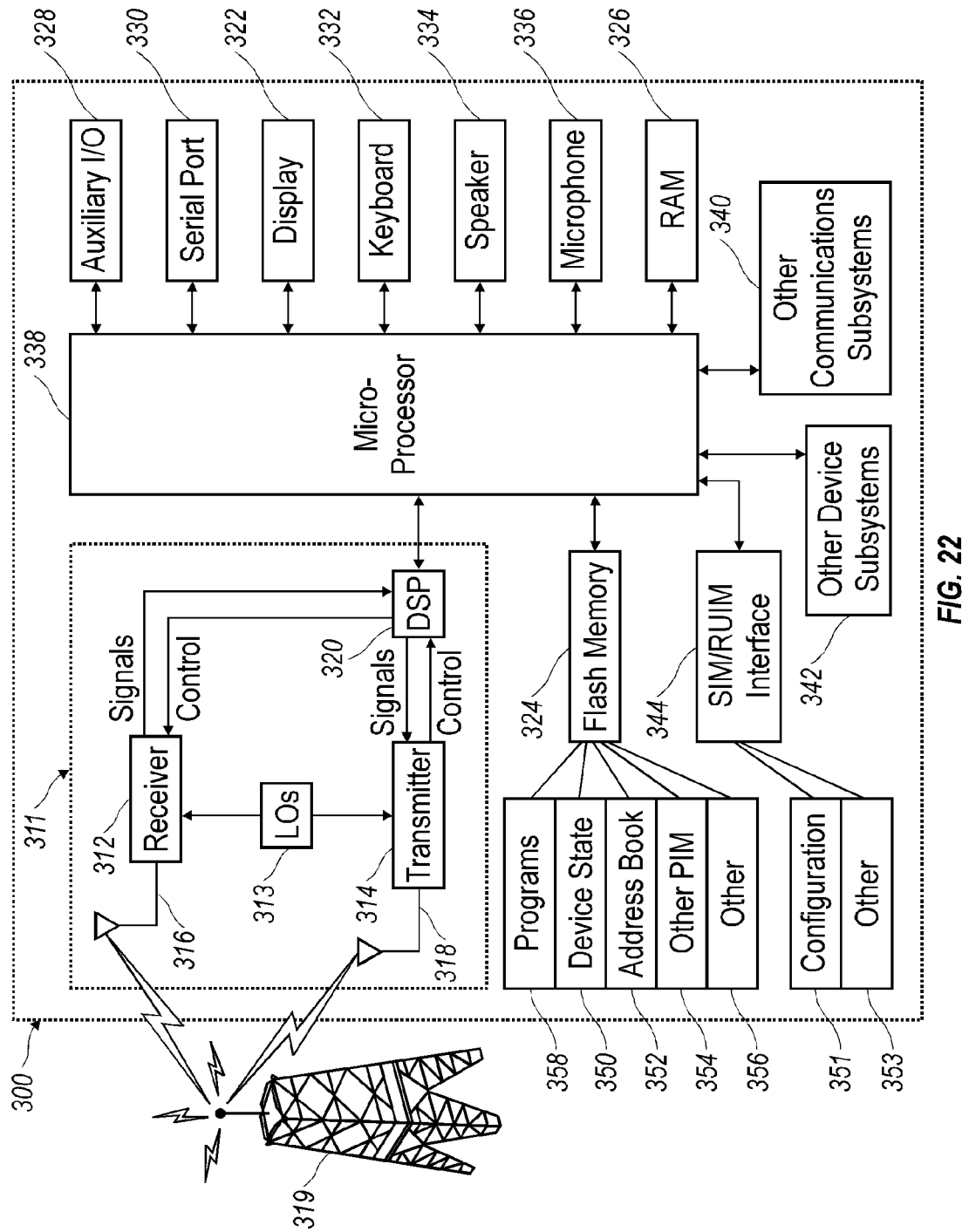
FIG. 22 is a block diagram illustrating a wireless handheld communication device interacting in a communication network.

An exemplary handheld electronic device 300 is shown in the assembly drawing of FIG. 6 and its cooperation in a wireless network is exemplified in the block diagram of FIG. 22. These figures are exemplary only, and those persons skilled in the art will appreciate the additional elements and modifications necessary to make the device work in particular network environments.

FIG. 6 is an exploded view showing some of the typical components found in the assembly of the handheld electronic device 300. The construction of the device benefits from various manufacturing simplifications. The internal components are constructed on a single PCB (printed circuit board) 102. The support frame 101 holds the keyboard 332 and cursor navigation assembly 328 in place above the PCB 102. The support frame 101 also provides an attachment point for the display (not shown). A lens 103 can cover the display to prevent damage. When assembled, the support frame 101 and the PCB 102 are fixedly attached to each other and the display 322 is positioned between the PCB 102 and support frame 101.

A serial port (preferably a Universal Serial Bus port) 330 and an earphone jack 140 can be fixedly attached to the PCB 102 and further held in place by right side element 105. Buttons 130, 131, 132, 133 can be attached to switches (not shown), which are connected to the PCB 102.

Final assembly can involve placing the top piece 107 and bottom piece 108 in contact with support frame 101. Furthermore, the assembly can interconnect right side element 105 and left side element 106 with the support frame 101, PCB 102, and lens 103. These side elements 105, 106 can provide additional protection and strength to the support structure of the device 300. In an embodiment, backplate 104 can be removably attached to the other elements of the device. As it may be appreciated by those having skill in the art, handheld electronic device 300 may be differently configured than the embodiment illustrated in FIG. 6 such that components and methods of assembly therefore, can vary The block diagram of FIG. 22, represents an embodiment of handheld electronic device 300 interacting in a communications network 319, and illustrates the use of a microprocessor 338 to control operation of the device 300. In FIG. 22, communication subsystem 311 performs all communication transmission and reception with wireless network 319. The microprocessor 338 further connects with an auxiliary input/ output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is capable of performing operating system functions and can enable execution of software applications on the communication device 300.

The above described auxiliary I/O subsystem 328 can take a variety of different subsystems including the above described cursor navigation assembly. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure.

In a preferred embodiment, the handheld electronic device 300 is designed to wirelessly connect with a communication network 319. Some communication networks that the handheld electronic device 300 may be designed to operate on require a subscriber identity module (SIM) or removable user identity module (RUIM). Thus, a device 300 intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, a flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 can be segregated upon storage in the flash memory 324 of the device 300. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300.

In a preferred embodiment, the device 300 is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short range communication subsystem 340. Other applications may be installed through connection with the wireless network 319, serial port 330 or via other short range communication subsystems 340.

When the device 300 is enabled for two-way communication within the wireless communication network 319, it can send and receive signals from a mobile communication service. Examples of communication systems enabled for two-way communication include, but are not limited to, the MOBITEX mobile communication system, DATATAC mobile communication system, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer.

For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different handheld electronic devices 300. Handheld electronic device 300 can be configured to operate some features without a SIM/RUIM card, but it may not be able to communicate with the network 319. In some locations, the handheld electronic device 300 can be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. Furthermore, a SIM/RUIM card can be enabled to store information about the user including identification, carrier and address book information. With a properly enabled handheld electronic communications device 300, two-way communication between the handheld electronic device 300 and communication network 319 is possible.

If the handheld electronic device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae 316, 318 in another preferred embodiment are combined into a single antenna (not shown). As one skilled in the art would appreciate, the antenna or antennae 316, 318 in another embodiment are externally mounted on the device 300.

When equipped for two-way communication, the handheld electronic device 300 features a communication subsystem 311. As is well known in the art, this communication subsystem 311 is modified so that it can support the operational needs of the device 300. The subsystem 311 includes a transmitter 314 and receiver 312 including the associated antenna or antennae 316, 318 as described above, local oscillators (LOs) 313, and a processing module 320 which in a preferred embodiment is a digital signal processor (DSP) 320.

A signal received by the wireless handheld electronic device 300 is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the communication device 300 is capable of transmitting signals to the communication network 319. The DSP 320 communicates the signals to be sent to the transmitter 314 and further communicates control functions, such as the above described gain control. The signal is emitted by the device 300 through an antenna 318 connected to the transmitter 314.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In the instance of voice communications, voice transmissions that originate from the communication device 300 enter the device 300 though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300 and the user can hear the voice communication that has been received. The device 300 in a preferred embodiment is enabled to allow for full duplex voice transmission.

In another embodiment, the voice transmission may be received by the communication device 300 and translated as text to be shown on the display screen 322 of the communication device 300. The communication device 300 is also capable of retrieving messages from a voice messaging service operated by the communication network operator. In a preferred embodiment, the device 300 displays information in relation to the voice message, such as the number of voice messages or an indication that a new voice message is present on the operating system.

In a preferred embodiment, the display 322 of the communication device 300 provides an indication about the identity of an incoming call, duration of the voice communication, telephone number of the communication device, call history, and other related information. It should be appreciated that the above described embodiments are given as examples only and one skilled in the art may effect alterations, modifications and variations to the particular embodiments without departing from the scope of the application.

As stated above, the communication device 300 and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the communication device 300 to properly transmit the email message over a given communication network 319.

Furthermore, the email message may instead be transmitted from the device 300 via a serial port 330, another communication port 340, or other wireless communication ports 340. The user of the device 300 can generate a message to be sent using the keyboard 332 and/or auxiliary I/O 328, and the associated application to generate the email message. Once the email message is generated, the user may execute a send command which directs the email message from the communication device 300 to the communication network 319. In an exemplary embodiment, a keyboard 332, and preferably an alphanumeric keyboard is used to compose the email message. In a preferred embodiment, an auxiliary I/O device 328 is used in addition to the keyboard 332.

While the above has been described in relation to email messages, one skilled in the art can modify the procedures to function with other types of data such as SMS text messages, internet websites, videos, instant messages, programs and ringtones. Once the data is received by the microprocessor 338, the data is placed appropriately within the operating system of the device 300. This might involve presenting a message on the display 322 which indicates the data has been received or storing it in the appropriate memory 324 on the device 300. For example, a downloaded application such as a game will be placed into a suitable place in the flash memory 324 of the device 300. The operating system of the device 300 will also allow for appropriate access to the new application as downloaded.

Exemplary embodiments have been described hereinabove regarding handheld electronic devices 300 and wireless handheld communication devices 300 as well as the communication networks within which they cooperate. It should be appreciated, however, that a focus of the present disclosure is the enablement of a keyboard for a handheld electronic device with flexible keys to prevent or minimize typing errors due to finger overlap with multiple keys.

We claim:

1. A wireless handheld mobile communication device having a keypad arrangement configured for minimizing typing errors when an intended key and an adjacent key are engaged at substantially the same time by a typist because of finger overlap, the device comprising:

a housing configured to be cradled in a palm of a user's hand and having a display located in a top portion thereof for displaying information to the user and a keypad arrangement exposed for user actuation below the display, the keypad arrangement comprising:

a support frame face upon which a plurality of depressible typing keys are mounted and each of the keys is moveable between actuated and unactuated positions wherein the actuated position is closer to the support frame face than the unactuated position;

each of the keys having a plurality of actuators interconnected to a body of the key at a position toward the support frame face from the key body and each of the plurality of actuators being moveable with the key body between actuated and unactuated positions wherein the actuated position is closer to the support frame face than the unactuated position and each of the actuators is biased toward the unactuated position; and each of the plurality of actuators interconnected to a particular key body being spaced apart, one from the others, and the key body comprising a flexible portion between the plurality of actuators, the flexible portion being sufficiently flexible to allow one actuator to be in the actuated position while at least one of the other of the plurality of actuators on that key body is in the unactuated position.

2. The wireless handheld mobile communication device as recited in claim 1, wherein the device has a width greater than fifty millimeters and less than eighty-nine millimeters thereby facilitating user palm-cradling of the device.

3. The wireless handheld mobile communication device as recited in claim 1, wherein the plurality of actuators interconnected to the particular key body are circumferentially apart about a centerpoint of the key body at an interval approximately equal to 360 degrees divided by the number of actuators constituting the plurality of actuators interconnected to the particular key body.

4. The wireless handheld mobile communication device as recited in claim 1, wherein two actuators are interconnected to the particular key body and are circumferentially apart about a centerpoint of the key body at an interval of approximately 180 degrees.

5. The wireless handheld mobile communication device as recited in claim 4, further comprising an actuator and a closeable switch capable of providing tactile feedback positioned at a centerpoint of the particular key body.

6. The wireless handheld mobile communication device as recited in claim 4, wherein the key body is substantially rectangular in shape and the two actuators are located at opposite corners of the key body.

7. The wireless handheld mobile communication device as recited in claim 6, wherein, for each actuator located at the corner of the key body, the portion of the key body to which the particular actuator is interconnected is more stiff than the flexible portion of the key body.

8. The wireless handheld mobile communication device as recited in claim 1, wherein four actuators are interconnected to the particular key body and are circumferentially apart about a centerpoint of the key body at an interval of approximately 90 degrees.

9. The wireless handheld mobile communication device as recited in claim 8, further comprising an actuator and a closeable switch capable of providing tactile feedback positioned at a centerpoint of the particular key body.

10. The wireless handheld mobile communication device as recited in claim 8, wherein the key body is substantially rectangular in shape and the four actuators are located in corners of the key body.

11. The wireless handheld mobile communication device as recited in claim 10, wherein, for each actuator located at the corner of the key body, the portion of the key body to which the particular actuator is interconnected is more stiff than the flexible portion of the key body.

12. The wireless handheld mobile communication device as recited in claim 1, further comprising:

a series electrical circuit associated with each of the key bodies for detecting when an intended key is actuated, the series circuit comprising a number of closeable switches equal to the number of actuators constituting the plurality of actuators interconnected to the particular key body, each of the closeable switches being configured to be closed when engaged by a corresponding actuator.

13. The wireless handheld mobile communication device as recited in claim 1, further comprising:

a series electrical circuit associated with each of the key bodies for detecting when an intended key is actuated, the series circuit comprising a number of closeable switches equal to the number of actuators constituting the plurality of actuators interconnected to the particular key body, each of the closeable switches being configured to be closed when a corresponding actuator is in the actuated position.

14. The wireless handheld mobile communication device as recited in claim 1, wherein each key body has an exposed finger-engageable surface having a width of less than seven millimeters.

15. The wireless handheld mobile communication device as recited in claim 1, wherein each key body has an exposed finger-engageable surface having a width of approximately three millimeters.

16. The wireless handheld mobile communication device as recited in claim 1, wherein said device is capable of wireless voice communication and wireless data communication.

17. The wireless handheld mobile communication device as recited in claim 1, wherein said plurality of keys have letter indicia arranged in a QWERTY format associated therewith.

18. The wireless handheld mobile communication device as recited in claim 1, further comprising an auxiliary input device located substantially between said display and said keypad arrangement.

19. The wireless handheld mobile communication device as recited in claim 1, further comprising an auxiliary input device located substantially between said display and said keypad arrangement, said auxiliary input device being a trackball arrangement.

20. The wireless handheld mobile communication device as recited in claim 1, further comprising an auxiliary input device located substantially between said display and said keypad arrangement, said auxiliary input device being a navigation key.

21. The wireless handheld mobile communication device as recited in claim 1, further comprising an auxiliary input device located substantially between said display and said keypad arrangement, said auxiliary input device being a navigation wheel.

22. The wireless handheld mobile communication device as recited in claim 1, further comprising an auxiliary input device located substantially between said display and said keypad arrangement, said auxiliary input device being cursor keys.

23. The wireless handheld mobile communication device as recited in claim 1, further comprising an auxiliary input device, said auxiliary input device being a track wheel.

24. The wireless handheld mobile communication device as recited in claim 1, further comprising an auxiliary input device located substantially between said display and said keypad arrangement, said auxiliary input device being a roller barrel.

25. The wireless handheld mobile communication device as recited in claim 1, further comprising an auxiliary input device located substantially between said display and said keypad arrangement, said auxiliary input device being a touch pad.

26. The wireless handheld mobile communication device as recited in claim 1, further comprising an auxiliary input device located substantially between said display and said keypad arrangement, said auxiliary input device being a joystick.

27. A keypad arrangement configured for minimizing typing errors when an intended key and an adjacent key are engaged at substantially the same time by a typist because of finger overlap, the keypad arrangement comprising:
   a support frame face upon which a plurality of depressible typing keys are mounted and each of the keys is moveable between actuated and unactuated positions wherein the actuated position is closer to the support frame face than the unactuated position;
   each of the keys having a plurality of actuators interconnected to a body of the key at a position toward the support frame face from the key body and each of the plurality of actuators being moveable with the key body between actuated and unactuated positions wherein the actuated position is closer to the support frame face than the unactuated position and each of the actuators is biased toward the unactuated position; and
   each of the plurality of actuators interconnected to a particular key body being spaced apart, one from the others, and the key body comprising a flexible portion between the plurality of actuators, the flexible portion being sufficiently flexible to allow one actuator to be in the actuated position while at least one of the other of the plurality of actuators on that key body is in the unactuated position.

28. The arrangement as recited in claim 27, wherein the plurality of actuators interconnected to the particular key body are circumferentially apart about a centerpoint of the key body at an interval approximately equal to 360 degrees divided by the number of actuators constituting the plurality of actuators interconnected to the particular key body.

29. The arrangement as recited in claim 27, wherein two actuators are interconnected to the particular key body and are circumferentially apart about a centerpoint of the key body at an interval of approximately 180 degrees.

30. The arrangement as recited in claim 29, further comprising an actuator and a closeable switch capable of providing tactile feedback positioned at the centerpoint of the particular key body.

31. The arrangement as recited in claim 29, wherein the key body is substantially rectangular in shape and the two actuators are located at opposite corners of the key body.

32. The arrangement as recited in claim 31, wherein, for each actuator located at the corner of the key body, the portion of the key body to which the particular actuator is interconnected is more stiff than the flexible portion of the key body.

33. The arrangement as recited in claim 27, wherein four actuators are interconnected to the particular key body and are circumferentially apart about a centerpoint of the key body at an interval of approximately 90 degrees.

34. The arrangement as recited in claim 33, further comprising an actuator and a closeable switch capable of providing tactile feedback positioned at a centerpoint of the particular key body.

35. The arrangement as recited in claim 33, wherein the key body is substantially rectangular in shape and the four actuators are located in corners of the key body.

36. The arrangement as recited in claim 35, wherein, for each actuator located at the corner of the key body, the portion of the key body to which the particular actuator is interconnected is more stiff than the flexible portion of the key body.

37. The arrangement as recited in claim 27, further comprising:
   a series electrical circuit associated with each of the key bodies for detecting when an intended key is actuated, the series circuit comprising a number of closeable switches equal to the number of actuators constituting the plurality of actuators interconnected to the particular key body, each of the closeable switches being configured to be closed when engaged by a corresponding actuator.

38. The arrangement as recited in claim 27, further comprising:
   a series electrical circuit associated with each of the key bodies for detecting when an intended key is actuated, the series circuit comprising a number of closeable switches equal to the number of actuators constituting the plurality of actuators interconnected to the particular key body, each of the closeable switches being configured to be closed when a corresponding actuator is in the actuated position.

39. The arrangement as recited in claim 27, wherein each key body has an exposed finger-engageable surface having a width of less than seven millimeters.

40. The arrangement as recited in claim 27, wherein each key body has an exposed finger-engageable surface having a width of approximately three millimeters.

* * * * *